United States Patent [19]

Rule et al.

[11] Patent Number: 4,786,713
[45] Date of Patent: Nov. 22, 1988

[54] COPOLY(ARYLENE SULFIDEX-DISULFIDE)

[75] Inventors: Mark Rule; David R. Fagerburg; Joseph J. Watkins, all of Kingsport; Jerry S. Fauver, Blountville, all of Tenn.

[73] Assignee: Eastman Kodak Company, Rochester, N.Y.

[21] Appl. No.: 117,722

[22] Filed: Nov. 6, 1987

[51] Int. Cl.$^4$ ............................................. C08G 75/14
[52] U.S. Cl. ....................................... 528/389; 528/86
[58] Field of Search ................................. 528/389, 86

[56] References Cited

U.S. PATENT DOCUMENTS 2,513,188  6/1950  Macallum ........................... 260/79
2,538,941  1/1951  Macallum ........................... 260/79
3,285,882 11/1966  Pike .................................. 260/79
4,645,825  2/1987  Idel et al. .......................... 528/388
4,645,826  2/1987  Iizuka et al. ...................... 528/388

Primary Examiner—Harold D. Anderson
Attorney, Agent, or Firm—Charles R. Martin; William P. Heath, Jr.

[57] ABSTRACT

A copoly(arylene sulfide) corresponding to the structure

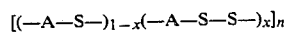

$[(-A-S-)_{1-x}(-A-S-S-)_x]_n$ wherein x is in the range of 0.5 to 0.001 prepared by reacting a mixture of a diiodoaromatic compound and elemental sulfur.

7 Claims, No Drawings

COPOLY(ARYLENE SULFIDEX-DISULFIDE)

The invention relates to a copoly(arylene sulfide) prepared by heating a diiodoaromatic compound in the presence of elemental sulphur.

Poly(arylene sulfide) (PAS) resins are thermoplastic polymeric materials with good thermal stability, unusual insolubility, resistance to chemical environments and inherent flame resistance. PAS resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

Poly(phenylene sulfide) (PPS) is a commercial product which is generally produced by reacting p-dichlorobenzene with sodium sulfide in a polar organic solvent to produce PPS and the by-product sodium chloride. This process is known as the Macallum polymerization procedure and the basic process is disclosed in U.S. Pat. No. 2,513,188 and U.S. Pat. No. 2,583,941. An improvement on the Macallum polymerization procedure involves adding N-haloamides as catalysts in the procedure (U.S. Pat. No. 3,285,882). The Macallum polymerization utilizes only chloroaromatic compounds.

The PPS which is formed in the Macallum process has only a modest molecular weight on the order of 10,000–40,000 and has relatively low melt viscosity. Higher molecular weights can be obtained by heating the PPS in the presence of oxygen. During heating, the molecular weight of the PPS increases due to a variety of chemical reactions including oxidation, crosslinking and chain extension. These curing reactions result in polymers which have inherent brittleness and reduced drawing capability while only achieving modest increases in molecular weight. Additionally, PPS which is produced by polymerization in the presence of sulfide and/or hydrosulfide salts, such as sodium sulfide and sodium hydrosulfide, has a residual content of inorganic salt present in the polymer. These residual salts are, for example, sodium chloride and sodium sulfide resulting from the combination of the sodium cation with chlorine or sulfide from the starting materials. The presence of these residual salts in the polymer increases the corrosive nature of the polymer and can cause a deterioration in the drawing or spinning characteristics of the polymer. Residual salts can also result in breakages in the spun fibers and additionally contribute to plugging and clogging of the spinnert holes.

An additional problem with poly(arylene sulfide) produced by the Macallum process is the effect of residual salts on the electrical properties. The presence of residual salts results in polymers with increased moisture adsorption and electrical activity, which are detrimental to applications requiring highly insulating characteristics. Although extensive extraction reduces the salt content of PPS produced by the Macallum process, complete removal of these salts is commercially infeasible.

An additional problem with PPS produced by the Macallum process is the high rate of crystallization of these polymers. Although some applications do require high rates of crystallization, many applications require much slower rates of crystallization. These polymers contain no substantial quantities of disulfide units.

U.S. Pat. No. 4,645,826 discloses a process of preparing "ultra-high molecular weight" linear PAS by first preparing a prepolymer with a melt viscosity between 5–3,000 poise and then performing a liquid-liquid two-phase polymerization. Only dichloroaromatic compounds are disclosed and the prepolymer is formed using a conventional alkaline metal sulfide. The "ultra-high molecular weight" polymers have melt viscosities of only tens of thousands of poise. The prepolymer is formed by a standard Macallum polymerization in the presence of an alkali metal sulfide. Accordingly, the polymers produced will suffer from the problems associated with residual salt content noted above. These polymers are also thought to contain no substantial quantities of disulfide units.

U.S. Pat. No. 4,645,825 also discloses poly(arylene sulfide) produced using dichloroaromatic or dibromoaromatic compounds and polymerizing in the presence of conventional alkaline metal sulfides or hydrosulfides. Although polymers with relatively high molecular weights and melt viscosities can be produced by this process, the presence of residual inorganic salts in the polymer results in inferior corrosion characteristics as well as poor spinning and drawing capability. These polymers are also thought to have no substantial quantities of disulfide units.

We have now discovered a poly(arylene sulfide) which does not contain substantial quantities of alkali metals and has an adjustable rate of crystallization. The copolymers of this invention do not contain substantial quantity of alkali metals simply because no alkali metal is used in the process used to prepare the polymer. Although Applicants do not wish to be limited to any particular theory, it is believed that the variable rate of crystallization of the copolymer is due to the presence of small amounts of (—A—S—S—) or disulfide units in the polymer chain. Thus, these polymers can be considered to be copolymers. The presence of these disulfide units in the copolymer do not materially affect other important properties of the polymer, such as glass transition temperature, solvent resistance, thermal stability, and oxidative stability.

The vast majority of units in the copolymer prepared by the process of this invention are the (—A—S—) unit and the number of (—A—S—S—) or disulfied units are small compared to the number of (—A—S—) units. Generally, the fraction of (—A—S—S—) units is in the range of 0.5 to 0.001, based on the combined number of both (—A—S—) and (—A—S—S—) units. Thus, the copolymer can be represented as

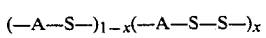

$$(-A-S-)_{1-x}(-A-S-S-)_x$$

where x is in the range of 0.5 to 0.001. The sequence of (—A—S—) and (—A—S—S—) units is thought to be random throughout the molecular chain. When x is in the range of 0.5 to 0.2 the polymers obtained when A is p-phenylene are amorphorus and can be crystallized only with difficulty. When x is in the range of 0.2 to 0.1 the polymers obtained can be thermally crystallized and have crystalline melting points of 230–260 degree C. When x is in the range of 0.1 to 0.05 the polymers obtained have moderate crystallization rates and the crystallized polymers can be annealed to high crystalline melting points (280°–290° C.) and show Tch (temperature of crystallization on heating) and Tcc (temperature of crystallization on cooling) at increasingly lower and higher temperatures, respectively, indicative of increasing rates of crystallization. When x is in the range of 0.05 to 0.001 the crystallization rate increases rapidly with decreasing x.

The following table more clearly shows the effect of disulfide units on the crystallization rate of poly(phenylene sulfide):

| X | Tg | Tcc | Tch | Tm | T½ (130° C.) |
|---|----|-----|-----|----|---|
| 0.25 | 88 | — | — | 238 | |
| 0.14 | 90 | — | — | 251 | |
| 0.12 | 94 | — | — | 255 | 132 Seconds |
| 0.10 | 92 | 168 | — | 243 | |
| 0.064 | 94 | 142 | 231 | 280 | |
| 0.055 | 95 | 140 | 226 | 278 | |
| 0.049 | 95 | 126 | 240 | 280 | |
| 0.000 | 91 | 126 | 242 | 278 | 12 Seconds |

The size of the polymer chain can conveniently be expressed as the total number of each kind of unit in the chain. Therefore, the copoly(arylene sulfide) of this invention can be more specifically expressed as corresponding to the structure $$[(-A-S-)_{1-x}(-A-S-S-)_x]_n$$

wherein n, the degree of polymerization, is at least 200 and is preferably in the range of 500 to 5,000 as determined by melt viscosity measurement at 300° C. The degree of polymerization when A is p-phenylene can be calculated using the relationship log (n)=1.473+0.2873×log (melt viscosity) where melt viscosity is measured in poise.

In the process used to prepare the copoly(arylene sulfide) of this invention a diiodoarylene compound corresponding to the structure $$I-A-I$$

where A is a divalent arylene radical is reacted with elemental sulfur to produce a substantially linear copoly(arylene sulfide) having both (—A—S—) units and (—A—S—S—) units.

Diiodoaromatic compounds which can be utilized in the present process include unsubstituted or substituted aromatics which have two iodine substituents. Suitable diiodoaromatic compounds include hydrocarbon aromatics, nitrogen-containing aromatics, sulfur-containing aromatics and oxygen-containing aromatics. Typical hydrocarbon aromatics include benzene and biphenyl, and condensed ring aromatics such as naphthalene and anthracene. Typical sulfur-containing aromatics include, for example, thiophene and benzothiophene. Typical nitrogen-containing aromatics include pyridine and quinoline. Suitable oxygen-containing aromatics are, for example, furan, dibenzofuran, etc. Substituted diiodoaromatic compounds suitable for use with the present invention include aromatic sulfones, diaryleth-ers, diarylcarbonyls, diarylsulfides and the like.

The aromatic starting materials may be substituted by one or more alkyl groups, preferably alkyl groups having from 1-6 carbon atoms. Specially preferred alkyl groups are methyl, ethyl, propyl and butyl groups. There is no limitation on the spatial arrangement of the substituents, for example, the substituents may be on a carbon adjacent to an iodine bearing carbon or may be on a carbon atom further removed from the iodine bearing carbon.

Additional substituents on the aromatic compounds may include phenyl, halogen, hydroxy, nitro, amino, $C_{1-6}$ alkoxy, and carboxylate and carboxylic acid substituents, as well as aryl sulfones and aryl ketones.

Preferred diiodoaromatic compounds are the diiodobenzenes, diiodonaphthalenes, diiodobiphenyls, diiododiphenyl ethers and diiodotoluenes which may be unsubstituted or substituted with any of the substituents noted above.

Specific diiodoaromatic compounds suitable for the present invention include p-diiodobenzene, m-diiodobenzene, p,p'-diiodobiphenyl, m,p'-diiodobiphenyl, p,p'-diiododiphenyl sulfone, p,p'-diiododiphenyl ether, 2,6-diiodonaphthalene, and p,p'-diiodobenzophenone. p-diiodobenzene, p,p'-diiodobiphenyl, and p,p'-diiododiphenyl ether are most preferred.

The diiodoaromatic starting materials of the present invention may be prepared by any suitable process. For example, the diiodoaromatic compounds may be prepared by standard liquid or gas phase iodination reactions. Although the diiodoaromatic compounds may be prepared by any such process, the preferred method of preparing the diiodoaromatic starting materials is that disclosed in copending application Ser. Nos. 912,806, filed Sept. 9, 1986; 026,896, filed Mar. 25, 1987; 029,959, filed Mar. 25, 1987 and 029,898, filed Mar. 25, 1987. Alternatively, the diiodoaromatic compounds may be produced by a transiodination process such as that disclosed in copending application Ser. Nos. 029,899, filed Mar. 25, 1987; 029,956, filed Mar. 25, 1987; and 029,949, filed Mar. 25, 1987. The disclosures of these copending applications are incorporated herein by reference for a more complete description of these preferred processes.

Sulfur is reacted as elemental sulfur and may consist of any of the standard forms which are possible for elemental sulfur. That is, the sulfur may be present in any of its allotropic modifications such as orthorhombic cyclooctasulfur ($S_8$) or any other cyclic elemental sulfur such as any of the cyclosulfur species having 6–12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98%–100%, although sulfur having a lower degree of purity may be used. This lack of sensitivity to the presence of impurities in the sulfur is advantageous to the present process when used as a commercial process since highly purified sulfur is not required and the associated expense is not incurred.

In the process used to prepare the co(polyarylene sulfide) of this invention sulfur reacts with a diiodoaromatic compound, eliminating elemental iodine and forming the PAS as shown below.

$$nArI_2 + nS \rightarrow (-Ar-S-)_n + nI_2$$

The formation of polymer is not sensitive to the relative stoichiometry of the diiodoaromatic compound and sulfur. Accordingly, an excess of sulfur or an excess of diiodoaromatic compound may be used in the polymerization process. When excess sulfur is used, some disulfide linkages are observed in the polymer. Decreasing amounts of sulfur result in decreasing levels of disulfide linkages in the final polymer. When the diiodoaromatic compound is present in excess, polymerization to high polymer can still occur, if the excess diiodoaromatic compound is removed during final polymerization.

The polymerization reaction is preferably carried out in the absence of solvent by merely heating and reacting the sulfur and diiodoaromatic compound. Under these conditions, the diiodoaromatic compound itself acts as a solvent for the sulfur which is melted thereby forming a substantially homogeneous solution enabling a facile and complete reaction.

In another embodiment, the diiodoaromatic compound can be dissolved in an organic solvent which is inert to the reaction conditions, i.e., which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene with sulfur, one might use benzene, toluene or naphthalene as a solvent.

It is also possible to perform the polymerization reaction of the present invention by solid state polymerization. Solid state polymerization enables very high molecular weights and melt viscosities to be achieved. After an initial melt polymerization (or alternatively solution polymerization) has been performed, the product is cooled to a solid state. Further heating and polymerization in the solid state under vacuum or inert gas flow dramatically increases the molecular weight allowing weight average molecular weights in excess of 100,000 to be achieved. It is significant to note that substantially no cross-linking occurs during the solid state or melt polymerization processes. The very high molecular weight copolymers which are produced after the solid state polymerization are still substantially linear and have excellent film and fiber forming properties.

During the polymerization reaction between the diiodoaromatic compound and sulfur elemental iodine is produced and evolves from the reaction melt, solution, or solid. Removal of the elemental iodine provides a driving force for completion of the polymerization reaction. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes. The present reaction, therefore, does not result in wasted reaction products since both the PAS and elemental iodine are useful commercial chemical products.

The polymerization reaction is generally conducted at a temperature above about 175° C. Although the reaction may be conducted at temperatures below 175° C., the polymerization reaction is much slower. There is no particular upper temperature limit on the polymerization reaction, which may be conducted at any temperature below the decomposition temperature of the diiodoaromatic compound. For most polymerization reactions, temperatures in the range of about 175°–400° C. will be suitable, although for particular diiodoaromatic compounds temperatures in excess of 400° C. may be used. Particularly preferred temperature ranges are from about 180°–350° C.

The reaction is generally conducted for a period of at least one-half hour and is continued for up to about 10 hours or longer, and reaction times approaching infinity are theoretically possible. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semi-continuous or continuous process. Agitation of the reaction mixture is optional, however agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodoaromatic compound and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

The copolymer of this invention is useful for preparation of various shaped articles such as pellets, fibers and molded articles. The polymer can be prepared into these shaped articles by conventional processes, such as injection molding and melt spinning.

Since there are no alkali metal containing materials in the reaction, there are no substantial quantities of alkali metal in the polymer matrix. Typically, there is less than 100 weight parts per million alkali metal, preferably less than 10 weight parts per million, based on the weight of the copoly(arylene sulfide). The absence of substantial quantities of alkali metal greatly enhance the capability of the polymer to be melt processed, particularly melt spun into fibers.

The copoly(arylene sulfide) and particularly the copoly(phenylene sulfide) of this invention have an adjustable rate of crystallization, due to the presence of the disulfide linkages. Since the concentration of disulfide linkages can be varied over a wide range, the rate of crystallization can be readily adjusted to suit the technological application without unduely sacrificing other desirable characteristics of the polymer. In addition, the rate of crystallization can be further enhanced by the addition of conventional nucleating aids such as talc, terephthalic acid, silica or the like for those applications where extremely fast rates are desired.

Other features of the invention will become apparent in the course of the following descriptions of exemplary embodiments which are given for illustration of the invention and are not intended to be limiting thereof.

EXAMPLES

The melt-phase polymerization reactions described in the examples below were carried out in a stirred flask fitted with a vacuum-jacketed Vigreux column and a receiver cooled in dry ice. The temperature/pressure profile used was 230° C./120 Torr for three hours, 230° C./4 Torr for another hour, then raising the temperature to 250° C. for one hour, and, finally raising the temperature for 280°–300° C. for the last 1–3 hours. Fiber-forming capabilities of these polymer were established by drawing strands from the polymer melt. Some polymers were tested to determine the value of x or the number of (—A—S—) units and (—A—S—S—) units in the polymer chain. In some cases the weight parts per million alkali metal and crystallization rate were determined.

The weight parts per million alkali metal, based on the weight of the poly(arylene sulfide) were determined by atomic adsorption analysis.

The crystallization rate was determined by differential scanning colorimetry half-times or by comparing the Tcc and Tch for the polymer in question to that of a polyphenylene sulfide homopolymer sold under the tradename of Ryton® PPS. All DSC analyses were run at 20° C./min scan rate under $N_2$.

The degree of polymerization (n) was determined by measuring melt viscosity and applying the relationship log (n)=1.473+0.2873×log (melt viscosity).

Melt viscosity was determined on a Rheometrics Mechanical Spectrometer (Model RMS-7220) at 300° C. and 25 radians/second. All samples were predried in a vacuum oven and run under air.

The value of x for moderate valves of x were determined by elemental analysis and calculation based on the excess sulfur present. For low values of x the values can be determined by digestion of the polymer by concentrated nitric acid, which oxidizes all disulfide linkages to sulfonic acid. Titration for sulfonic acid determines the amount of disulfide present.

Example 1

200.0 Grams of p-diiodobenzene and 20.0 grams of elemental sulfur (3.0% excess) were reacted as noted above. A hard, glassy polymer was obtained which could be pressed into rigid, creasable films. The fibers obtained could be knotted without breaking. The material was insoluble in 1,2,4-trichlorobenzene at 100° C., and dissolved slowly over two hours in chloronaphthalene at 210° C. The infrared spectrum of the pressed film was identical to that for authentic poly(phenylene sulfide). Elemental analysis of the polymer was consistent with the empirical formula $(C_6H_4S_{1.10})$. The yield of the polymer was 60 grams. The alkali metal content was <5 ppm. The polymer was thermally crystallizable with a Tm of 243° C., a Tg of 91.4° C. and Tch of 168° C. (first cycle). The value of x was 0.10. The melt viscosity was 20,000 P, giving a value of n of 511. Amorphorus pressed films had a density of 1.331 g/cc and contained 890 ppm total iodide. Thermal gravimetric analyses showed 5% weight loss of 475° C. (scanning at 10° C./min, in air and $N_2$).

Example 2

50.0 Grams of 2,6-diidonaphthalene and 4.35 grams of elemental sulfur (3.0% excess) were reacted as noted above. A hard, glassy brittle polymer was obtained. DSC found a Tg of 182° C. The alkali metal content was <5 ppm.

Example 3

50.0 Grams of 4,4'-diiodobiphenyl and 4.06 grams of elemental sulfur (3.0% excess) were reacted as noted above. After two hours, the reaction mixture became solid. Reaction was continued at 250° C. for two more hours, then the product was removed and powdered. The powder was then solid-state polymerized at 250° C. for 24 hours. The powder yielded a creasable film when melt-pressed at 450° C.

Example 4

205.0 Grams of p-diiodobenzene and 20.0 grams of sulfur (0.25% excess) were reacted as noted above. The resulting polymer could be drawn into long fibers and pressed into creasable films. The material had a measured Tg of 88°–91° C.

Example 5

211.0 Grams of 4,4'-diiododiphenyl ether and 16.0 grams of sulfur (stoichiometric amount of sulfur) were reacted as noted in Example 1. 98 Grams of a very tough, glassy polymer were obtained. The material had a measured Tg of 100° C.

Example 6

205.0 Grams of p-diiodobenzene, 0.10 grams of iodonitrobenzene, and 10.0 grams of sulfur (50% of theoretical) were reacted as noted above, except the final vacuum was <1 torr. A large amount of p-diiodobenzene distilled out under polymerization conditions. The final polymer was highly viscous, and yielded creasable pressed films. The polymer yield was 31.9 grams. DSC found a Tg of 94° C.; the density of the amorphous film was 1.34 grams/cc.

Example 7

153.7 Grams p-diiodobenzene (0.466 moles), 63.1 grams 4,4'-diiodobiphenyl (0.155 moles) 20.0 grams sulfur, and 0.10 grams p-iodonitrobenzene were polymerized as in Example 6. The material yielded a tough, creasable film with a measured Tg of 125° C. The final polymer contained 400 ppm total iodine.

Example 8

102.5 Grams p-diiodobenzene (0.31 moles), 126.14 grams 4,4'-diiodobiphenyl (0.31 moles) 20.0 grams sulfur (0.62 moles), and 0.1 grams p-iodonitrobenzene were polymerized as in Example 6. The material yielded creasable films with a measured Tg of 152° C. Elemental analysis expected for this polymer is C=73.95%, H=4.11%. Found C=72.26%, H=4.05%).

Example 9

51.25 Grams p-diiodobenzene (0.155 moles), 51.25 grams m-diiodobenzene (0.155 moles) 10.0 grams sulfur (0.311 moles), and 0.1 grams p-iodonitrobenzene were polymerized as in Example 6. The material yielded brittle films with a measured Tg of 68° C. Infrared analysis of these films showed peaks at 777 and 876 cm$^{-1}$ unique to meta-substituted benzene, and a peak at 812 cm$^{-1}$ unique to para-substituted benzene.

Example 10

205.0 Grams of p-diiodobenzene, 19.0 grams of sulfur (95% of theory) and 0.10 grams p-iodonitrobenzene were polymerized as in Example 6. The final polymer yielded tough, creasable films. Infrared analysis of the pressed film showed the characteristic strong peak at 812 cm$^{-1}$ characteristic of para-substituted benzene, and no detectable peaks at 777 and 876 cm$^{-1}$, characteristic of meta substituted benzene. The infrared spectrum was indistinguishable from that of a pressed film of Ryton® P-6. This demonstrates that substantially no positional isomerization of the aromatic compound occurs during polymerization.

Example 11

200.0 Grams of p-diiodobenzene, 19.5 grams sulfur (0.3% excess) and 0.4 grams 1,3-diiodo-5-nitrobenzene were polymerized in Example 6. Long fibers could be pulled from the melt, and pressed films were tough, creasable, and thermally crystallizable. DSC analysis revealed a Tg of 94° C. and a Tm of 255° C. (first cycle). The melt viscosity at 300° C. was 70,000 P, giving a degree of polymerization (n) of 733. The half-times for crystallization from the glass were 135 seconds at 120° C., 132 seconds at 130° C., 130 seconds at 140° C., and 120 seconds at 160° C. DSC found no Tcc or Tch. Elemental analysis found C=64.30%, H=3.68%, I=646 ppm, Cr=9 ppm, Ni=14 ppm, Fe=110 ppm. The empirical formula for this polymer is $C_8H_4S_{1.12}$, and x=0.12.

Example 12

A sample of commercial Ryton ® P-6 PPS was analyzed. The melt viscosity at 300° C. was 770 P. DSC analysis revealed a Tg of 91.0° C. and a Tm of 278° C. (second cycle), Tm=282° C. (first cycle), Tch=126° C., Tcc=242° C. The half-times for crystallization from the glass were 24 seconds at 120° C. and 12 seconds at 130° C. A sample of Ryton ® P-4 had a melt viscosity of 3500 P at 300° C. and DSC behavior identical to the Ryton ® P-6. Thermal gravimetric analysis showed 5% weight loss at 500° C. (scanning at 10° C./min in air and nitrogen). Elemental analysis found C=66.37%, H=3.70%, Cl=0.20%, Na=0.13%, K=48 ppm, Ca=326 ppm, Mg=149 ppm, Fe=40 ppm, Ni=11 ppm, Cr=6 ppm, corresponding to an empirical formula of $C_6H_4S_{1.00}$ on an ash-free basis. The mole fraction of disulfide units (x) is 0.000.

Example 13

410.0 Grams of p-diiodobenzene (1.24 moles), 38.0 grams sulfur (1.19 moles) and 0.2 grams p-iodonitrobenzene were polymerized as in Example 6, except the final reaction temperature was 250° C. The polymer obtained could be pressed into brittle films. DSC showed a Tg of 85° C.

Example 14

80 Grams of the polymer obtained in Example 13 was granulated and crystallized by contacting with toluene. After drying the solid polymer was divided into 4 portions and was solid-state polymerized under vacuum at 210° C. for 3, 6, 12, and 24 hours. Melt viscosity was measured on these samples at 300° C. The results are tabulated below:

| Solid Stating Time, Hour | Melt Viscosity | n | Tg | Tm | C,H | | x |
|---|---|---|---|---|---|---|---|
| 3 | 5566 | 354 | 88° C. | 230° C. | 62.25 | 3.56 | .233 |
| 6 | 7003 | 378 | 88° C. | 234° C. | 63.31 | 3.58 | .175 |
| 12 | 13151 | 453 | 88° C. | 238° C. | 61.94 | 3.52 | .252 |
| 24 | 18440 | 500 | 88° C. | 242° C. | 61.85 | 3.55 | .256 |

These polymers exhibited no Tcc or Tch under the DSC conditions, consistent with a difficultly crystallizable polymer.

Example 15

410.0 grams p-diiodobenzene (1.24 moles), 38.0 grams sulfur (1.19 moles) and 0.2 grams p-iodonitrobenzene were polymerized as in Example 6 except that the final temperature was 275° C. The resultant polymer had a melt viscosity of 11,450 poise at 300° C. The polymer was thermally crystallized at 175° C., then solid-state polymerized under vacuum at 210° C. for 21 hours. The resultant polymer had a melt viscosity at 300° C. of 40,180 poise and a value of n of 625. The polymer had a Tg of 90.2° C., Tm of 251° C., no Tcc or Tch on second DSC cycle. Elemental analysis found C=64.00%, H=3.65%, consistent with the formula $C_6H_4S_{1.14}$; therefore x=0.14 in this polymer.

Example 16

410.0 Grams of p-diiodobenzene (1.24 moles), 38.0 grams of sulfur (1.19 moles) and 0.2 grams p-iodonitrobenzene were polymerized as in Example 6 (300° C. final temperature). The polymer had a measured melt viscosity of 48,830 poise at 300° C. Solid-state polymerization as in Example 15 yielded a polymer with a melt viscosity at 300° C. of 130,900 poise and a value of n of 877. The final polymer had a Tg of 89.1° C., Tm of 250° C., no Tch or Tcc on second DSC cycle. Elemental analysis found C=63.97, H=3.69; therefore x=0.135 for the polymer.

Example 17

410.0 grams p-diiodobenzene, 38.0 grams sulfur, and 0.8 grams diiodonitrobenzene were polymerized as in Example 6, except that the final reaction temperature was 250° C. The low molecular weight polymer crystallized on cooling. DSC analysis of this prepolymer showed a Tg of 73° C., Tm of 248° C., and Tch (temperature of crystallization on heating) of 175° C. The prepolymer was ground and solid-state polymerized for 16 hours at 260° C. The solid-state polymerized PPS obtained had a measured Tg of 94° C. and Tm of 288° C., and a melt viscosity of 69,080 poise at 300° C. with a value of n of 730.

Example 18

410.0 grams of p-diiodobenzene (1.24 moles) 34.00 grams of sulfur (1.06 moles) and 0.80 grams diiodonitrobenzene were polymerized as in Example 6 except that the final polymerization temperature was 250° C. The low molecular weight polymer crystallized rapidly on cooling and exhibited a second cycle Tg of 84.5° C., Tch of 162.6° C., Tm of 272° C., and a Tcc of 197° C. 10 grams of this polymer was ground to pass a 3 mm screen and was then solid-state polymerized at 240° C. for 23 hours under vacuum. The resultant polymer had a first cycle Tm of 285.3° C., and a second cycle Tg of 94.7° C., Tch of 170.5° C., Tm of 267.3° C., and Tcc of 177.8° C. Elemental analysis found C=65.58%, H=3.56%, consistent with the formula $C_6H_4S_{1.057}$. For this polymer x=0.057.

Example 19

10 grams of the prepolymer of Example 18 was solid state polymerized at 260° C. for 25 hours under vacuum. The resultant polymer a first cycle Tg of 101° C., Tm of 288° C., second cycle Tg of 98.5° C., Tch of 145.4° C., Tm of 265.4° C., and Tcc of 198.8° C.

Example 20

410.0 grams p-diiodobenzene, 36.0 grams sulfur, and 0.80 grams diiodonitrobenzene were reacted as in Example 6, except that the final temperature was 250° C. This polymer which crystallized rapidly on cooling, showed a second cycle Tg of 78° C., Tch of 135° C., Tm of 271° C., and TCC of 212° C. Solid-state polymerization of the ground polymer under nitrogen flow at 240° C. for 20 hours yielded a polymer with a first cycle Tm of 284° C., and a second cycle Tg of 95.4° C., Tch 171.6° C., Tm of 271° C., and Tcc of 189° C. Melt viscosity at 300° C. was 107,900 poise, corresponding to a molecular weight of 179,270 and a degree of polymerization (n) of 830.

Example 21

410.0 grams p-diiodobenzene, 36.00 grams sulfur, and 0.80 grams diiodonitrobenzene were reacted as in Example 6 with the final polymerization temperature 300° C. The resultant high molecular weight polymer crystallized on cooling. Solid state polymerization at 240° C. under vacuum for 20 hours yielded a polymer with a Tg of 98.1° C. and a Tm of 280° C. Melt viscosity at 300° C. was 410,069 poise, corresponding to a molecular weight of 263,000 and a degree of polymerization (n) of 1,218.

Example 22

410.0 grams p-diiodobenzene, 32.00 grams sulfur, and 0.80 grams diiodonitrobenzene were reacted as in Example 6 except that the final reaction temperature was 250° C. After grinding, the prepolymer was solid-state polymerized at 260° C. for 24 hours under vacuum. The resulting polymer had a first cycle Tm of 291.8° C., second cycle Tg of 94° C., Tch of 126° C., Tm of 279.5° C., and Tcc of 240.0° C. Elemental analysis found C=65.73%, H=3.57%, corresponding to an empirical formula of $C_6H_4S_{1.049}$ and an x of 0.049.

Example 23

410.0 grams p-diiodobenzene, 32.00 grams sulfur, and 0.80 grams diiodonitrobenzene were reacted as in Example 6, with the final polymerization temperature 300° C. The high viscosity polymer crystallized rapidly on cooling and yielded tough pressed films. DSC of this polymer found first cycle Tm of 278° C., and second cycle Tg of 94.1° C., Tch of 142.1° C., Tm of 279.8° C., and Tcc of 230.9° C. Elemental analysis found C=65.46%, H=3.53% corresponding to an empirical formula of $C_6H_4S_{1.064}$ and x equals 0.064.

Example 24

10 grams of the ground polymer from Example 22 was solid-state polymerized at 260° C. for 24 hours under vacuum. The polymer obtained had a first cycle Tm of 284.2° C., and a second cycle Tg of 95.0° C., Tch of 140.3° C., Tm of 278.3° C., and a Tcc of 226.2° C. Elemental analysis found 65.66% C, 3.49% H, corresponding to an empirical formula of $C_6H_4S_{1.055}$, and x equals 0.055.

Obviously, numerous modifications and variations of the present invention are possible in light of the above teachings. It is therefore to be understood that within the scope of the appended claims, the invention may be practiced otherwise than as specifically described herein.

We claim:

1. A copoly(arylene sulfide) having repeating units of the formula

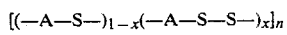

wherein A is a divalent substituted or unsubstituted aromatic radical, x is in the range of 0.5 to 0.001 and n is at least 200.

2. The copoly(arylene sulfide) of claim 1 wherein n is at least 400.

3. The copoly(arylene sulfide) of claim 1 wherein the aromatic radical is phenylene, biphenylene, diphenyl ether, or naphthalene.

4. The copoly(arylene sulfide) of claim 3 wherein the aromatic radical is unsubstituted phenylene or biphenylene radical.

5. The copoly(arylene sulfide) of claim 4 wherein the aromatic radical is unsubstituted phenylene.

6. The copoly(arylene sulfide) of claim 1 wherein n is in the range of 500 to 5,000.

7. A copoly(phenylene sulfide) having repeating units of the formula

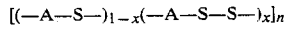

wherein A is a divalent unsubstituted phenylene radical, x is in the range of 0.5 to 0.001, and n is at least 400.

* * * * *